United States Patent Office 3,552,986
Patented Jan. 5, 1971

3,552,986
PRINTING AND COATING UNTREATED POLYOLEFINS
Robert W. Bassemir, Jamaica, N.Y., and Richard Dennis, East Rutherford, and Gerald I. Nass, West New York, N.J., assignors to Sun Chemical Corporation, New York, N.Y., a corporation of Delaware
No Drawing. Filed Nov. 24, 1967, Ser. No. 685,268
Int. Cl. C08d 1/00; C08f 1/18, 1/24
U.S. Cl. 117—12                 17 Claims

ABSTRACT OF THE DISCLOSURE

Untreated polyolefin surfaces may be coated or printed with a solvent-free composition comprising a polymerizable polyethylenically unsaturated ester and a photoinitiator with or without a colorant.

This invention relates to novel compositions for printing or coating polyolefins. More particularly, it relates to solvent-free photosensitive inks and coating compositions for untreated polyolefins and to a method of coating or printing untreated polyolefins.

Polyolefins in general inherently possess certain desired properties, including good strength, low water permeability, and excellent low temperature sealability, that make them highly useful as packaging and wrapping materials, as pipes, bottles, cups and the like. Their use, however, has been somewhat limited because they do not retain standard printing inks and/or coatings. In ordinary handling, the ink smears or rubs off. According to the prior art, the ability of polyolefins to retain inks or coatings may be improved by subjecting the surface of the polyolefin materials to an activation treatment prior to the coating or printing step. Many such pretreatments have been suggested. In U.S. Pat. 2,632,921, for example, Kreidl discloses a differential heat treatment to prepare the polyolefin surface; pretreatment with a gas flame is taught by Kritchever (2,648,097), a 4000° F. flame by Grow et al. (2,795,820), an electric glow discharge by Berthold et al. (2,859,480), and a non-polymerizing, polar, hydrophilic aqueous phase overcoat by Rice et al. (3,076,720). Thus it can be seen that each of the prior art processes for improving adhesion of a printing ink to a polyolefin substrate requires that the polyolefin be treated in some manner in addition, and generally prior, to the application of the printing ink.

It has now been found that certain coating compositions, printing inks, and adhesives can be applied directly to untreated polyolefin. The dried coating or ink has excellent adhesion to the polyolefin as well as other outstanding properties, including soap-, water-, rub-, grease-, and scratch-resistance. Unlike the previously known processes such as those mentioned above, the process of this invention does not need or use a separate pretreatment of the polyolefin before printing, coating, or laminating.

In addition to having excellent adhesion to raw, untreated polyolefins, the compositions of this invention have many other advantages. They are solvent-free, thus eliminating the hazards and odor that accompany volatile solvents; they dry almost instantaneously in air at ambient temperature; they can withstand both heat and cold, making them useful as containers for food that must be sterilized, e.g., at about 150° C. under pressure, and refrigerated, e.g., at less then —20° C.; they are unaffected by condensation and are resistant to abrasion, grease, and so forth.

The present invention is applicable to the coating or printing of any polyolefin substrate or base, such as, for example, polymers of ethylene and of propylene. It is also possible to employ copolymers of ethylene and propylene either with each other or with at least one other polymerizable monomer such as, for example, those alpha-olefins having from 2 to 8 carbon atoms such as 1-butene, 1-pentene, 1-hexene, 1-octene, and mixed higher alpha-olefins. Other hydrocarbons useful for making copolymers with ethylene and propylene include divinylbenzene, allene, dimethallyl, and isopentene. Comonomers which can broadly be used include monosubstituted ethylenes such as 1-pentene, vinylcyclohexene, allyl benzene, $C_8$–$C_{14}$ mixed alpha-olefins, styrene, allyl naphthalene, and the like; 1,1-disubstituted ethylenes such as alpha-methyl styrene, 2-methylbutene-1, mixed alpha- and beta-pinenes, camphene, and the like; 1,2-disubstituted ethylenes such as indene, acenaphthylene, cyclopentene, norbornylene, cyclohexene, trans-stilbene, 2-pentene, and the like; conjugated dienes and trienes such as pentadiene-1,3, 1,2-dihydrobenzene, alloocimene, and cyclopentadiene; unconjugated dienes such as mixed octadienes, hexadiene-1,5, 2,5-dimethyl - hexadiene-1,5, 1,4-dihydrobenzene, bicycloheptadiene, bicyclopentadiene, 4-vinylcyclohexene-1, and 4-7-diphenyldecadiene-1,9; acetylenes such as isopropenyl acetylene and phenyl acetylene; chloroolefins such as beta-methallyl chloride, chloromethyl norbornylene, and m-chlorostyrene; ethers; epoxides; esters such as vinyl butyrate, vinyl acetate, and methyl acrylates; and nitrogen compounds such as vinyl carbazole, 4-vinyl pyridene, and acrylonitrile. Blends of such polymers and copolymers can also be employed to make the substrate resins.

In general the printing inks and coating compositions of this invention comprise (a) a photopolymerizable polyethylenically unsaturated compound and (b) a photoinitiator with or without (c) a colorant.

The photopolymerizable compounds usable in the present invention are free radical polymerizable polyfunctional ethylenically unsaturated monomers and prepolymers, e.g., dimers, trimers, and other oligomers; and mixtures and copolymers thereof. The term "polyethylenically unsaturated" as employed in the specification and claims refers to compounds having two or more terminal ethylenic groups. The photopolymerizable monomers or prepolymers may be generally described as the acrylic acid, methacrylic acid, and itaconic acid esters of aliphatic polyhydric alcohols such as, for example, the di- and polyacrylates, the di- and polymethacrylates, and the di- and polyitaconates of ethylene glycol, triethylene glycol, tetraethylene glycol, tetramethylene glycol, trimethylolethane, trimethylolpropane, pentaerythritol, dipentaerythritol, polypentaerythritols, and the like, and their prepolymers (dimers, trimers, etc.). For some purposes, it is further preferred that the monomers and prepolymers be high boiling, i.e., have a boiling point above about 200° C. Typical compounds include, but are not limited to, trimethylolpropane triacrylate, trimethylolethane triacrylate, trimethylolpropane trimethacrylate, trimethylolethane trimethacrylate, tetramethylene glycol dimethacrylate, ethylene glycol dimethacrylate, triethylene glycol dimethacrylate, tetraethylene glycol diacrylate, tetraethylene glycol dimethacrylate, and the like; and the prepolymers and mixtures thereof; pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexacrylate, tripentaerythritol octoacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipenaerythritol triitaconate, dipentaerythritol pentaitaconate, dipentaerythritol hexaitaconate, mixtures of dimers and trimers of pentaerythritol triacrylate, mixtures of dimers and trimers of tripentaerythritol octoacrylate, mixtures of dimers and trimers of dipentaerythritol hexacrylate, and the like; and mixtures of these.

The above-described esters may be obtained in any convenient manner, for example, by the ester interchange method of interacting a lower alkyl ester of the acid with the alcohol in the presence of a suitable catalyst or by the reaction of the alcohol with, e.g., acrylic or methacrylic acid or with an acrylyl or a methacrylyl halide.

The photoinitiator or sensitizer may be an acyloin or a derivative thereof, such as, for example, benzoin methyl ether, benzoin ethyl ether, desyl bromide, desyl chloride, desyl amine, and the like, and mixtures thereof. It may also be a halogenated aliphatic, aromatic, or alicyclic hydrocarbon, or a mixture thereof, in which the halogen atoms are attached directly to the ring structure in the aromatic and alicyclic compounds, that is, the halogen is bonded directly to the aromatic hydrocarbon nucleus; the halogen atoms are attached to the carbon chain in the aliphatic compounds. The halogen may be chlorine, bromine, or iodine. Suitable photoinitiators include, for example, polychlorinated polyphenyl resins, such as the Aroclors (Monsanto Chemical Co.) which in general are polychlorinated diphenyls, polychlorinated triphenyls, and mixtures of the two; chlorinated rubbers, such as the Parlons (Hercules Powder Co.); copolymers of vinyl chloride and vinyl isobutyl ether, such as Vinoflex MP–400 (BASF Colors and Chemicals Inc.); chlorinated aliphatic waxes, such as Chlorowax 70 (Diamond Alkali Co.); perchloropentacyclodecane, such as Dechlorane+ (Hooker Chemical Co.); chlorinated paraffins, such as Chlorafin 40 (Hooker Chemical Co.) and Unichlor–70B (Neville Chemical Co.); mono- and polychlorobenzenes; mono- and polybromobenzenes; mono- and polychloroxylenes; mono- and polybromoxylenes; dichloromaleic anhydride; 1-chloro-2-methyl naphthalene; 2,4-dimethylbenzene sulfonyl chloride; 1-bromo-3-(m-phenoxyphenoxy benzene); 2-bromoethyl methyl ether; chlorendic anhydride; and so forth; and mixtures of these.

The photopolymerizable monomer or prepolymer and the photoinitiator may be used alone or they may be used in combination with a film-forming compound to improve such properties as adhesion and stability to the temperature extremes required in pasteurization and refrigeration. These modifiers include, but are not limited to, such compounds as unsaturated polyester resins, aryl sulfonamide-formaldehyde resins, urea formaldehyde resins, cetyl vinyl ether, epoxy resins, and the like, and mixtures of these, as disclosed in copending application S.N. 556,568 (filed June 10 1966).

The photopolymerizable compound and initiator may also be used with about 0.1 to 2.0 percent of a chain transfer agent, by weight of the total composition, such as the mercaptans and their derivatives, for example, glycol mercaptoacetate and ethyl mercaptoacetate; tertiary aliphatic amines, e.g., triethylanolamine and t-butyldiethanolamine; morpholine; n-amino morpholine; n-amino ethylmorpholine; n-amino propylmorpholine; amine oxides, such as bis(2-hydroxyethyl)cocoamine oxide and bis(2-hydroxyethyl)octadecylamine oxide; cyclized unsaturated aromatic hydrocarbons, e.g., neohexene, cyclohexene, cyclooctene, and d-limonene; and the like; and mixtures thereof. Polymerization of compositions including chain transfer agents during storage of extended periods may be retarded by the inclusion of from about 0.1 to 5% of a stabilizer which is compatible with the photopolymerizable composition and does not significantly affect the polymerization rate thereof when exposed to ultraviolet light. Such a stabilizer is typified by diethylhydroxylamine.

The above-described additives may further be used in varying mixtures. The photopolymerizable esters of the present invention may be modified by the addition of a prepolymer, such as a diallyl phthalate prepolymer, and a chain transfer agent; a prepolymer and an unsaturated compound reactive with oxygen, e.g., an alkyd resin; a prepolymer and a further modifying substance, e.g., cetyl vinyl ether; a viscosity control agent together with a chain transfer agent, a prepolymer or other modifying resin; and mixtures thereof.

The ratio of the amount of the monomer or prepolymer to the photoinitiator in the composition may range from about 98:2 to about 15:85, and preferably from about 70:30 to about 30:70. When a modifier is used, the amount is about 10 to 85 percent, and preferably about 40 to 60 percent, of the weight of the photopolymerizable compound/modifier mixture.

The ingredients may be combined in any known and convenient manner, for example by mixing, grinding, or heating. The resulting ink composition is applied in any suitable manner onto the untreated polyolefin substrate.

Variables determining the rate at which a photopolymerizable composition will dry include the specific ingredients in the composition, concentration of the photoinitiator, thickness of the material, nature and intensity of the radiation source and its distance from the material, the presence or absence of oxygen, and the temperature of the surrounding atmosphere. The compositions of the present invention may be used in relatively thick layers or they may be used as thin films having thicknesses of from about 0.5 to 150 microns. Any suitable source of radiation may be used, such as a 100-watt Hanovia high pressure mercury arc quartz ultraviolet lamp, larger ultraviolet sources of higher wattage, a linear electron accelerator, or gamma radiation emitters, such as cobalt-60. Distances of the radiation source from the work may range from about ⅛ to 10 inches, and preferably from about ⅛ to 3 inches.

The compositions are preferably, but not necessarily, colored; they may be pigmented with many organic or inorganic pigments, e.g., molybdate orange, Lithol Rubine Red, titanium white, phthalocyanine blue, chrome yellow, carbon black, and the like, and mixtures thereof, as well as colored with dyes, in conventional amounts.

It is to be understood that various lubricants, plasticizers, and other modifiers may be incorporated in order to obtain certain desired characteristics in the finished product.

The ink compositions as described herein possess many advantages over the conventional thermal setting printing inks and coatings. The polyolefin surface need not be pretreated in any way. The use of volatile solvents and the attendant hazards and odor are eliminated. The inks and coatings have excellent adhesion to the polyolefin after exposure to radiation. They have good grease- and rub-resistance and withstand temperatures as high as 150° C. and as low as —20° C.

In addition to being suitable for coating and printing polyolefins, these compositions may also be used to print or coat paper, clay-coated paper, cardboard, boxboard, glass, textiles, metals, other plastics, and the like.

The polyolefin substrate that may be printed and/or coated by the process of this invention may be in any convenient form. It may, for example, be extruded thin films or sheets; blown bottles or blown tubing; or cast or molded films, sheets, rods, tubes, piping, filaments, and other shaped articles. The polyolefin may be unsupported or it may be supported on a substrate such as paper, cloth, wire, metal foil, glass fiber mats, and the like. Such materials as polyethylene board and polyethylene paper stock are also suitable.

In general this invention relates to printing or coating an untreated polyolefin surface. While usually the substrate will be either printed or coated, it is possible to combine the two, that is, the substrate can be printed with a colored composition and then overcoated with a clear composition; it is also possible to print on top of a surface that has been coated with the clear or colored photopolymerizable composition. When a surface is both printed and coated, the first material applied may be dried before the second is applied or both the coating and the printing ink may be dried at the same time. Other embodiments such as printing with more than one color are also within the scope of this invention.

In the following examples the degree of adhesion was determined by the Scotch tape test whereby a strip of Scotch tape was applied to the dried ink with sufficient pressure to assure complete adhesion. The tape was then stripped at a constant rate and the adherence characteristics gauged by the amount of ink that was removed by the tape. The scratch test which also determined the degree of adhesion was carried out by scratching the print with hard and uniform pressure of a fingernail and then checking the amount of ink that had been removed from the substrate.

While there are disclosed below but a limited number of embodiments of the invention herein presented, it is possible to produce still other embodiments without departing from the inventive concept herein disclosed. It is desired, therefore, that only such limitations be imposed on the appended claims as are stated therein.

EXAMPLE 1

An ink containing 15 percent of molybdate orange pigment, 2 percent of cyclohexene as the chain transfer agent, 1 percent of diethylhydroxylamine as the stabilizer, 38.5 percent of trimethylolpropane triacrylate, 5 percent of benzoin methyl ether, and 38.5 percent of Santolite MHP (Monsanto Chemical Co.'s p-toluene sulfonamide-formaldehyde resin) as the film-forming compound was applied to the outside surface of an untreated polyethylene cup. The printed cup was exposed at a distance of 2 inches from a 100-watt Hanovia mercury arc quartz ultraviolet lamp. The ink, which dried in less than 30 seconds, had excellent printing qualities, that is, gloss; grease resistance; dry rub, soap, and water resistance; and scratch resistance.

EXAMPLE 2

The procedure of Example 1 was repeated except that the pigment was chrome yellow and the substrate was a 1.5-mils thick sheet of untreated polyethylene. At a distance of 3 inches from the lamp and a drying time of 60 seconds on each side, the ink showed very good adhesion as indicated by both the Scotch tape and the scratch tests.

EXAMPLE 3

Several runs were made to show the effect of a variety of modifiers and additives to the ink. The results are tabulated below.

| Ink | Substrate | | | | | |
|---|---|---|---|---|---|---|
| | Polyethylene cup (1.5 mils thick) 1.5–2" from lamp | | | Polyethene film (0.5 mil thick) 3.5" from lamp | | |
| | Cure time, seconds | Scotch tape | Scratch | Cure time, seconds | Scotch tape | Scratch |
| A | <60 | E | G | >120 | F | E |
| B | <60 | E | VG | >120 | G | E |
| C | <60 | E | G | ~120 | VG | E |

Note: A=15% of moly orange pigment, 39.5% of Santolite MHP, 39.5% of trimethylolpropane triacrylate, 1.7% of cyclohexene, and 4.3% of benzoin methyl ether. B=15% of moly orange pigment, 39.3% of Santolite MHP, 39.3% of trimethylolpropane triacrylate, 1.7% of cyclohexene, 4.3% of benzoin methyl ether, and 0.4% of diethylhydroxylamine. C=15% of moly orange pigment, 19.5% of Santolite MHP, 19.5% of trimethylolpropane triacrylate, 39.5% of Superior's polyester H7353, 1.7% of cyclohexene, and 4.8% of benzoin methyl ether. E=Excellent. F=Fair. G=Good. VG=Very good.

EXAMPLE 4

(A) An ink comprising 15% of moly orange, 0.8% of triethanolamine, 4.3% of benzoin ethyl ether, 40% of Santolite MHP, and 39.9% of trimethylolpropane triacrylate was applied to the exterior of an untreated polyethylene cup and exposed at a distance of about 1 inch from the 100-watt Hanovia arc lamp. The ink dried in about 100 seconds and had excellent adhesion properties.

(B) The ink of part (A) was applied to the exterior of an untreated polyethylene cup and exposed at a distance of about 1 inch from a 12-inch Hanovia linear tube ultraviolet lamp. The ink dried in less than 1.5 seconds and had excellent adhesion properties.

EXAMPLE 5

A red ink was prepared from 67 parts of pentaerythritol triacrylate, 9.75 parts of Aroclor 1260 (Monsanto Chemical Co.'s biphenyl containing 60 percent of chlorine), 3.25 parts of Santolite MHP (Monsanto Chemical Co.'s p-toluene sulfonamide-formaldehyde resin), and 20 parts of Lithol Rubine red pigment.

A polyethylene bottle printed with this ink was exposed to a 1200-watt Hanovia high mercury pressure lamp at a distance of 1 inch. The ink dried in less than one second and had excellent adhesion to the untreated polyethylene as well as good grease- and rub-resistance. It withstood temperatures of 150° C. and −20° C.

EXAMPLE 6

A black ink was prepared from 38.5 parts of pentaerythritol triacrylate, 38.5 parts of tripentaerythritol octoacrylate, 9.75 parts of Aroclor 1260, 3.25 parts of Santolite MHP, and 10 parts of carbon black.

A polyethylene bottle was printed with the ink and exposed at a distance of 1 inch from a 1200-watt Hanovia high mercury pressure lamp. The ink dried in less than one second and had excellent adhesion to the untreated polypropylene as well as good grease- and rub-resistance. In addition, it withstood temperatures of 150° C. and −20° C.

EXAMPLE 7

The procedure of Example 5 was repeated except that a prepolymer (a mixture of dimers and trimers) of pentaerythritol triacrylate was used instead of the pentaerythritol triacrylate monomer. The results were comparable.

EXAMPLE 8

The procedure of Example 6 was repeated except that pentachlorobenzene was used instead of Aroclor 1260. The results were comparable.

EXAMPLE 9

The procedure of Example 6 was repeated except that 2-bromoethyl methyl ether was used instead of Aroclor 1260. The results were comparable.

EXAMPLE 10

The procedure of Example 6 was repeated except that chlorendic anhydride was used instead of Aroclor 1260. The results were comparable.

EXAMPLE 11

A blue ink was prepared from 70 parts of pentaerythritol tetraacrylate, 10 parts of pentachlorobenzene, and 20 parts of phthalocyanine blue. A polypropylene container was printed with the ink and subjected to ultraviolet light as in Example 5. After an exposure of three seconds, the ink was dry and adhered well to the untreated polypropylene surface.

EXAMPLE 12

A blue ink was prepared from 86 percent of a mixture of 70 percent of pentaerythritol triacrylate and 30 percent of Aroclor 4465 (Monsanto Chemical Co.'s mixture of bi- and triphenyls containing 65 percent of chlorine by weight); 12 percent of carbon black; and 2 percent of alkali blue. Untreated polypropylene film (1.5-mils thick) was printed with this ink and dried as in Example 5. The results were comparable.

EXAMPLE 13

A clear coating was prepared from 75 percent of dipentaerythritol hexacrylate, 16.67 percent of Aroclor 1260, and 8.33 percent of Santolite MHP. Untreated polypropylene film (1.5 mils thick) was coated with this composition and dried by the procedure of Example 5. The coating dried in 1.5 seconds and had excellent adhesion characteristics.

EXAMPLE 14

The procedure of Examples 1–4 were repeated except that each of the following was used as the chain transfer agent instead of cyclohexene and triethanolamine: morpholine, n-amino morpholine, d-limonene, glycol mercaptoacetate, and bis(2-hydroxyethyl) octadecylamine oxide. The results were comparable.

EXAMPLE 15

The procedure of Example 1 was repeated except that trimethylolethane triacrylate was used instead of trimethylolpropane triacrylate. The results were comparable.

EXAMPLE 16

The procedure of Example 1 was repeated except that a mixture of dimers and trimers, i.e., a prepolymer, of trimethylol propane triacrylate was used instead of the monomer. The results were comparable.

EXAMPLE 17

The procedures of Examples 1–4 were repeated using monomers and prepolymers of trimethylolpropane trimethacrylate and of tetraethylene glycol dimethacrylate instead of trimethylol propane triacrylate. The results were comparable.

EXAMPLE 18

A photopolymerizable composition was prepared from 95 percent of a 1:1 mixture of trimethylolpropane triacrylate and Santolite MHP and 5 percent of 2-bromoethyl methyl ether. The composition was applied to untreated polypropylene and dried as in Example 1. The results were comparable.

EXAMPLE 19

Lithol rubine red pigment (15%) was ground into a composition comprising 45 percent of a prepolymer mixture of pentaerythritol triacrylate, 35 percent of trimethylolpropane triacrylate, 2 percent of benzoin methyl ether, and 18 percent of Santolite MHP. The ink was applied to the outside surface of an untreated polyethylene cup and dried by the procedure of Example 1. The drying time was 1.5 seconds and the printing qualities of the ink were good.

EXAMPLE 20

Untreated polypropylene sheet 1.5 mils thick was coated with the clear composition of Example 13 and dried by exposure to ultraviolet light. The dried coating was then printed with the ink of Example 12 and the ink dried by exposure to ultraviolet light. Both the ink and the coating had good adhesion properties.

EXAMPLE 21

The procedure of Example 20 was repeated except that the substrate was printed, dried, coated, and dried. The results were comparable.

EXAMPLE 22

The procedure of Example 20 was repeated except that the ink was applied to the wet coating composition and then both were dried by exposure to ultraviolet light. The printed design was less distinct than in Example 20, but both the ink and the coating had good adhesion properties.

EXAMPLE 23

The procedure of Example 20 was repeated except that the clear coating was applied over the ink before the ink was dried. The printed design was less distinct than in Example 20, but both the ink and the coating had good adhesion properties.

EXAMPLES 24–35

The procedures of Examples 1 through 23 were repeated except that the printed and/or coated untreated polyolefins were exposed by passing them on a conveyor belt beneath the beam of a Dynacote 300,000-volt linear electron accelerator at a speed of 43 feet per minute and the beam current so regulated as to produce a dose rate of 0.5 megarad. The results were comparable.

While there are above disclosed but a limited number of embodiments of the process of the invention herein presented, it is possible to produce still other embodiments without departing from the inventive concept herein disclosed.

What is claimed is:

1. A method of coating non surface-treated polyolefin which comprises a (1) applying to a polyolefin substrate having no surface pretreatment a composition consisting essentially of (a) at least one ester of an ethylenically unsaturated acid and a dihydric alcohol, a trihydric alcohol, or a tetrahydric alcohol and (b) at least one photoinitiator selected from the group consisting of acyloin, an acyloin derivative, a halogenated aromatic or alicyclic hydrocarbon wherein the halogen atom is bonded directly to the nucleus, and a halogenated aliphatic hydrocarbon wherein the halogen atom is attached to the carbon chain and (2) exposing the coated substrate to a source of radiation.

2. The method of claim 1 wherein the source of radiation is ultraviolet light.

3. The method of claim 1 wherein the radiation is electron beam radiation.

4. The method of claim 1 wherein the radiation is gamma radiation.

5. The method of claim 1 wherein the ethylenically unsaturated acid is acrylic acid, methacrylic acid, or itaconic acid.

6. The method of claim 1 further comprising the steps of (3) printing the dried coated substrate with a composition consisting essentially of (a) at least one ester of an ethylenically unsaturated acid and a dihydric alcohol, a trihydric alcohol, or a tetrahydric alcohol; (b) at least one photoinitiator selected from the group consisting of acyloin, an acyloin derivative, a halogenated aromatic or alicyclic hydrocarbon wherein the halogen atom is bonded directly to the nucleus, and a halogenated aliphatic hydrocarbon wherein the halogen atom is attached to the carbon chain; and (c) at least one colorant, and (4) exposing the printed coated substrate to a source of radiation.

7. The method of claim 1 further comprising the step of printing the coated substrate with a composition consisting essentially of (a) at least one ester of an ethylenically unsaturated acid and a dihydric alcohol, a trihydric alcohol, or a tetrahydric alcohol; (b) at least one photoinitiator selected from the group consisting of acyloin, an acyloin derivative, a halogenated aromatic or alicyclic hydrocarbon wherein the halogen atom is bonded directly to the nucleus, and a halogenated aliphatic hydrocarbon wherein the halogen atom is attached to the carbon chain; and (c) at least one colorant, after the coating of step (1) and prior to the exposing of step (2).

8. A method of coating non-surface-treated polyolefin which comprises (1) applying to a polyolefin substrate having no surface pretreatment a composition consisting essentially of (a) at least one ester of an ethylenically unsaturated acid and a dihydric alcohol, a trihydric alcohol, or a tetrahydric alcohol; (b) at least one photoinitiator selected from the group consisting of acyloin, an acyloin derivative, a halogenated aromatic or alicyclic hydrocarbon wherein the halogen atom is bonded directly to the nucleus, and a halogenated aliphatic hydrocarbon wherein the halogen atom is attached to the carbon chain; and (c) at least one film-forming compound selected from the group consisting of unsaturated polyester resins, aryl sulfonamide-formaldehyde resins, urea formaldehyde resins, cetyl vinyl ether, and epoxy resins and (2) exposing the coated substrate to a source of radiation.

9. A method of printing non-surface-treated polyolefin which comprises (1) printing a polyolefin substrate having no surface pretreatment with a composition consisting essentially of (a) at least one ester of an ethylenically unsaturated acid and a dihydric alcohol, a trihydric alcohol, or a tetrahydric alcohol; (b) at least one photoinitiator selected from the group consisting of acyloin, an acyloin derivative, a halogenated aromatic or alicyclic hydrocarbon wherein the halogen atom is bonded directly to the nucleus, and a halogenated aliphatic hydrocarbon wherein the halogen atom is attached to the carbon chain; and (c) at least one colorant and (2) exposing the printed substrate to a source of radiation.

10. The method of claim 9 wherein the source of radiation is ultraviolet light.

11. The method of claim 9 wherein the radiation is electron beam radiation.

12. The method of claim 9 wherein the radiation is gamma radiation.

13. The method of claim 9 wherein the ethylenically unsaturated acid is acrylic acid, methacrylic acid, or itaconic acid.

14. The method of claim 9 wherein the ratio of (a) to (b) is about 98:2 to about 15:85.

15. The method of claim 9 further comprising the steps of (3) coating the dried printed substrate with a composition consisting essentially of (a) at least one ester of an ethylenically unsaturated acid and a dihydric alcohol, a trihydric alcohol, or a tetrahydric alcohol and (b) at least one photoinitiator selected from the group consisting of acyloin, an acyloin derivative, a halogenated aromatic or alicyclic hydrocarbon wherein the halogen atom is bonded directly to the nucleus, and a halogenated liphatic hydrocarbon wherein the halogen atom is attached to the carbon chain, and (4) exposing the coated printed substrate to a source of radiation.

16. The method of claim 9 further comprising the step of overcoating the printed substrate with a composition consisting essentially of (a) at least one ester of an ethylenically unsaturated acid and a dihydric alcohol, a trihydric alcohol, or a tetrahydric alcohol, and (b) at least one photoinitiator selected from the group consisting of acyloin, an acyloin derivative, a halogenated aromatic or alicyclic hydrocarbon wherein the halogen atom is bonded directly to the nucleus, and a halogenated aliphatic hydrocarbon wherein the halogen atom is attached to the carbon chain, after the printing of step (1) and prior to the exposing of step (2).

17. A method of printing non-surface-treated polyolefin which comprises (1) printing a polyolefin substrate having no surface pretreatment with a composition consisting essentially of (a) at least one ester of an ethylenically unsaturated acid and a dihydric alcohol, a trihydric alcohol, or a tetrahydric alcohol; (b) at least one photoinitiator selected from the group consisting of acyloin, an acyloin derivative, a halogenated aromatic or alicyclic hydrocarbon wherein the halogen atom is bonded directly to the nucleus, and a halogenated aliphatic hydrocarbon wherein the halogen atom is attached to the carbon chain; (c) at least one film-forming compound selected from the group consisting of unsaturated polyester resins, aryl sulfonamide-formaldehyde resins, urea formaldehyde resins, cetyl vinyl ether, and epoxy resins; and (d) at least one colorant and (2) exposing the printed substrate to a source of radiation.

References Cited

UNITED STATES PATENTS

| | | | |
|---|---|---|---|
| 2,413,973 | 1/1942 | Howk et al. | 204—158 |
| 3,412,104 | 11/1968 | McIntosh et al. | 106—20X |
| 3,368,900 | 2/1968 | Burg | 204—159.23X |
| 3,364,049 | 1/1968 | Deak et al. | 117—12X |
| 3,218,302 | 11/1965 | Melamed | 204—159.23X |
| 3,216,885 | 11/1965 | Schaufelberger | 117—12X |
| 3,203,802 | 8/1965 | Burg | 96—87 |
| 3,134,684 | 5/1964 | Northrop et al. | 117—15 |
| 3,047,422 | 7/1962 | Sites et al. | 117—38 |
| 3,046,127 | 7/1962 | Barney | 204—159.23 |
| 3,036,986 | 5/1962 | Adicoff | 204—159.23 |
| 2,480,749 | 8/1949 | Marks | 18—58 |

OTHER REFERENCES

Sittig, "Polyolefin Resin Processes," Gulf Publishing Co., Houston, Tex., 1961, pp. 2, 5 and 6.

ALFRED L. LEAVITT, Primary Examiner

A. M. GRIMALDI, Assistant Examiner

U.S. Cl. X.R.

96—35.1, 87; 106—20; 117—38, 93.31, 161; 204—159.23